(12) United States Patent  
Eames (10) Patent No.: US 7,576,326 B2  
(45) Date of Patent: Aug. 18, 2009

(54) DEVICES AND METHODS FOR DETECTING AND ANALYZING RADIATION

(75) Inventor: Dexter Eames, Cambridge, MA (US)

(73) Assignee: XRF Corporation, Somerville, MA (US)

( * ) Notice: Subject to any disclaimer, the term of this patent is extended or adjusted under 35 U.S.C. 154(b) by 139 days.

(21) Appl. No.: 11/759,389

(22) Filed: Jun. 7, 2007

(65) Prior Publication Data

US 2008/0001884 A1    Jan. 3, 2008

Related U.S. Application Data

(60) Provisional application No. 60/811,550, filed on Jun. 7, 2006.

(51) Int. Cl.  
*G01T 1/24* (2006.01)

(52) U.S. Cl. .................................. 250/370.09

(58) Field of Classification Search ............ 250/370.09, 250/370.11  
See application file for complete search history.

(56) References Cited

U.S. PATENT DOCUMENTS

| | | | |
|---|---|---|---|
| 4,253,023 A | 2/1981 | Whited | |
| 4,893,018 A | 1/1990 | Saitou | |
| 5,854,489 A | 12/1998 | Verger et al. | |
| 6,420,710 B1 | 7/2002 | Verger et al. | |
| 6,940,589 B1 * | 9/2005 | Suyama et al. | 356/213 |
| 2005/0246140 A1 * | 11/2005 | O'Connor et al. | 702/189 |
| 2007/0235657 A1 * | 10/2007 | He et al. | 250/389 |

FOREIGN PATENT DOCUMENTS

| EP | 0375131 A2 | 6/1990 |
|---|---|---|
| EP | 1329700 A1 | 7/2003 |

OTHER PUBLICATIONS

L. T. Jones and P. B. Woollam, "Resolution Improvement in CdTe Gemma Detectors Using Pulse-Shape Discrimination," Nuclear Instruments and Methods (124), 1975, pp. 591-595, North-Holland Publishing Co.

H. H. Barrett, J. D. Eskin and H. B. Barber, "Charge Transport in Arrays of Semiconductor Gamma-Ray Detectors," Physical Review Letters, Jul. 3, 1995, pp. 156-159, vol. 75, No. 1, Department of Radiology and Optical Sciences Center, University of Arizona, Tucson, AZ, USA.

(Continued)

*Primary Examiner*—David P Porta  
*Assistant Examiner*—Marcus H Taningco  
(74) *Attorney, Agent, or Firm*—Miles & Onello, LLP (57) ABSTRACT

Provided are a device and method for detecting and analyzing radiation. A detection unit includes a detector, and generates signal pulses from photons of the radiation. Each signal pulse has an amplitude that is determined by an interaction of the photons at a depth of the detector. A pulse deficit correction trigger corrects for charge deficits that occur from the photon interaction across the depth of the detector by removing depth dependence in the amplitudes of the signal pulses. A multi-channel analyzer receives the signal pulses and generates a spectrum from the received signal pulses, and receives a trigger signal that is generated by the pulse deficit correction trigger to remove the depth dependence in the amplitudes of the signal pulses.

23 Claims, 8 Drawing Sheets

OTHER PUBLICATIONS

P. N. Luke, "Unipolar Charge Sensing with Coplanar Electrodes—Application to Semiconductor Detectors," IEEE Transactions on Nuclear Science, Aug. 1995, pp. 207-213, vol. 42, No. 4, Engineering Division, Lawrence Berkeley Laboratory, University of California, Berkeley, CA, 94720, USA.

M. A. J. Van Pamelen, C. Budtz-Jorgensen, I. Kuvvetli, "Development of CdZnTe X-ray Detectors at DSRI," Nuclear Instruments and Methods in Physics Research, 2000, pp. 625-633, Section A 439, Elsevier Science B.V., Netherlands.

International Search Report dated Aug. 27, 2008 issued in corresponding International Application No. PCT/US2007/070583.

Eames, Dexter, "Pulse Deficit Correction Trigger for Planar CdTe Based Gamma-ray Spectrometer," IEEE Nuclear Science Symposium Conference, Manuscript received Nov. 22, 2006.

\* cited by examiner

DEVICES AND METHODS FOR DETECTING AND ANALYZING RADIATION

RELATED APPLICATIONS

This application claims the benefit of U.S. Patent Application No. 60/811,550 filed on Jun. 7, 2006, entitled "A Semiconductor Gamma Ray Detector with Improved Efficiency and Resolution and Method Thereof," the contents of which is incorporated herein in its entirety by reference.

FIELD OF THE INVENTION

The present invention relates to devices and methods that improve the efficiency and resolution of a radiation detector by correcting for "hole tailing," such devices and methods including the use of a novel trigger method and circuit.

BACKGROUND OF THE INVENTION

Room temperature semiconductor gamma ray detectors have been in use for many years and offer several advantages over other technologies employed in gamma ray detection. Semiconductor detectors include crystals that have good resolution and are robust against temperature change and vibration. Cadmium telluride (CdTe), mercuric iodide ($HgI_2$) and cadmium zinc telluride (CdZnTe) are preferred room temperature semiconductor detector materials that are routinely used due to their ability to operate at room temperature and their inherent high efficiency.

Conventional gamma ray detectors can include a planar crystal having conducting surfaces on opposing faces of the crystal. A bias voltage is applied across the conducting surfaces of the crystal to attract charge carriers, including electron charge carriers and hole charge carriers, that are released upon interaction with a high energy photon incident on the crystal. The electrons move toward a first conducting surface on a first face of the crystal and the holes move toward a second conducting surface on a second face of the crystal.

The signal induced on contacts at the conductive surfaces of the detector crystal is a product of the amount of charge released and its travel distance, the signal being the sum of the signals resulting from the electron travel to the faces of the crystal. The electron charge carriers produce a signal that accurately represents the energy of the incident photon as a function of the depth of interaction, whereas the hole charge carriers are slower moving and have lifetimes that may be short with respect to the travel time across the crystal, so that the contribution from the hole charge carriers may have a deficit. In a simple planar detector, a bias voltage applied across the conducting faces of the detector is normally set so that photons interacting at the front face of the detector will result in the electrons traveling the longer distance through the crystal, with the holes traveling the shorter distance through the crystal to the front contact. If the photon interacts near the front surface of the crystal, then the signal will be dominated by the electron signal, and will accurately represent the energy of the photon. However, when photon interactions occur at greater depths in the crystal, the hole charge carriers become more significant, resulting in a signal with a slower rise time and a lower amplitude. As a result, the photons that interact deeper in the crystal produce an undesirable "hole tailing" effect on the low energy side of the photopeaks. Low energy photons are mostly stopped at the surface of the crystal where they generate pulses with a full amplitude, but higher energy photons that penetrate further into the detector generate pulses having an amplitude deficit, the deficit being caused by poor hole mobility in the crystal. More specifically, hole tailing is caused by an asymmetry in the transport properties of the electron and hole charge carriers; in particular, a high number of holes may become trapped during movement toward the negative electrode, which reduces the collection efficiency and spectral resolution of the detector.

Several techniques have been developed to address and overcome the issue of hole tailing. However, these conventional techniques require complex contact structures such as pixelation or co-planar grids in order to reduce the effect of the hole charge carriers on the detected signal. For example, electron-only detection methods rely on a complicated electrode geometry to produce a detector that is sensitive to charge carrier movement only as it approaches the collection anode or positive electrode at the first face of the crystal. In one approach, a pixelated detector is used in gamma cameras. See H. H. Barrett, J. D. Eskin, H. B. Barber, "Charge Transport in Arrays of Semiconductor Gamma-Ray Detectors," Phys. Rev. Lett., vol. 75, no. 1, pp. 156-159 (1995), referred to as "Barrett, et al.," incorporated herein in its entirety by reference. In another approach, electron-only geometries including a coplanar grid are used. See P. N. Luke, "Unipolar Charge Sensing with Coplanar Electrodes—Application to Semiconductor Detectors," IEEE Trans. Nuc. Sci., vol. 42, no. 4, pp. 207-213, (1995), referred to as "Luke," incorporated herein in its entirety by reference. In another approach, a drift strip is used. See M. A. J. van Pamelen, C. Budtz-Jorgensen, I. Kuvvetli, "Development of CdZnTe X-Ray Detectors at DSRI," Nucl. Instr. and Meth. A 439, pp. 625-633 (2000), referred to as "van Pamelen et al.," incorporated herein in its entirety by reference. However, the abovementioned approaches include a single charge carrier detector having an increased cost due to added electronics and other factors. Pixelated detectors, such as those disclosed in Barrett, et al., incorporated by reference above, require a signal channel per pixel, and coplanar grid detectors, such as those disclosed in Luke, incorporated by reference above, require three signal channels. Further, the electrodes of conventional detectors are also more expensive to produce than planar electrodes due to the masking required, wherein the masking requires extra steps in order to create high resolution electrode patterns on the crystal.

Other approaches in improving the resolution of the spectrum involve accepting only the photons that interact near the surface of the detector. One such method, referred to as Pulse Shape Discrimination, is described in L. T. Jones and P. B. Woolam, "Resolution Improvement in CdTe Gamma Detectors Using Pulse-Shape Descrimination," Nucl. Instr. and Meth. Vol. 124, pp. 591-595 (1975), referred to as "Jones et al." incorporated herein in its entirety by reference. This method can produce good resolution at the expense of reduced collection efficiency. However, only the top layer of the crystal is used for photon collection, and photons that interact within the bulk of the crystal, i.e., at depths below that of the top layer of the crystal, are ignored. There is also an added cost in circuitry required to distinguish between the pulses. Often the rise time of the each pulse is measured to determine where the photon interaction occurred in the crystal, and a pulse rejection circuit is required.

Another approach is to correct for the amplitude deficit caused by the hole charge carriers. Whited (U.S. Pat. No. 4,253,023), incorporated herein in its entirety by reference, discloses a method that uses two signal channels with two time constants to separate out the contributions from the electrons and the holes and to correct for the charge deficit of the hole carriers. Saitou (U.S. Pat. No. 4,893,018), incorporated herein in its entirety by reference, discloses circuitry that detects the amplitude and the rise time, then produces a depth signal, and generates a correction signal. Verger, et al. (U.S. Pat. Nos. 5,854,489, 6,420,710), each incorporated herein in its entirety by reference, disclose methods that rely upon measuring the rise time and the amplitude of each pulse separately and computing a correction factor. However, the approaches described above require additional signal channels to measure the depth of interaction and calculate a correction value that is applied to the signal.

SUMMARY OF THE INVENTION

To address the above limitations, a feature of the present invention is to correct for the hole charge deficit of semiconductor radiation detectors by using a novel trigger that produces a signal that is independent of the depth of interaction within the crystal of the incident photon.

In accordance with an aspect of the invention, there is provided a device for detecting and analyzing radiation comprising a detection unit, a pulse deficit correction trigger, and a multi-channel analyzer. The detection unit includes a detector, the detection unit generating signal pulses from photons of the radiation, each signal pulse having an amplitude that is determined by an interaction of photons at a depth of the detector. The pulse deficit correction trigger corrects for charge deficits resulting from the photon interaction by removing a depth dependence in the amplitudes of the signal pulses. The multi-channel analyzer generates a spectrum from the signal pulses, and receives a trigger signal generated by the pulse deficit correction trigger to remove the depth dependence in the amplitudes of the signal pulses.

In an embodiment, the detection unit comprises a room-temperature semiconductor gamma ray detector. The detector can include a crystal. The crystal can comprise a material including at least one of CdTe and CdZnTe.

In one embodiment, the detection unit detects at least one of X-rays and gamma rays.

In an embodiment, the detection unit comprises a detector that generates pulses from the photons, a charge sensitive pre-amplifier that amplifies the pulses, a shaping filter that shapes the pulses, and an amplifier that generates the signal pulses having the amplitudes from the shaped pulses.

In an embodiment, the trigger circuit comprises a threshold detector that generates a threshold signal in response to a comparison between the amplitudes of the signal pulses and a threshold reference, and a delay circuit that applies a delay to the threshold signal and generates the trigger signal from the delayed threshold signal. The trigger signal is generated at a constant delay time after the signal pulses have exceeded the threshold reference. The multi-channel analyzer is triggered by the trigger signal to indicate a time at which each signal pulse should be sampled to obtain the amplitude. When the multi-channel analyzer is triggered at a constant delay time after the signal pulses have exceeded the threshold reference, the depth dependence in the amplitude of each pulse is removed.

In an embodiment, the multi-channel analyzer comprises an analog-to-digital converter that is triggered by the trigger signal.

In accordance with another aspect of the invention, there is provided a gamma ray spectrometer comprising a detector that detects photons and generates pulses from the high energy photons, a shaping filter that shapes the pulses, a threshold detector that detects when the pulses have exceeded a threshold reference and generates a threshold signal, a delay circuit that delays the threshold signal, and a trigger circuit that generates a trigger from the delayed threshold signal.

In an embodiment, the spectrometer further comprises a multi-channel analyzer that generates a spectrum from the pulses and that receives the trigger from the trigger circuit to cancel depth dependence in amplitudes of the pulses on a low-energy side of high-energy peaks in the spectrum. The trigger is applied to an analog-to-digital converter of the multi-channel analyzer. The analog-to-digital converter is triggered to indicate a time at which the pulses should be sampled to obtain the amplitudes. The trigger is generated at a constant delay time after the signal pulses have exceeded the threshold reference. When the analog-to-digital converter is triggered at a constant delay time after the pulses have exceeded the threshold reference, the depth-dependence in the amplitudes of the pulses is canceled.

In an embodiment, the gamma ray spectrometer is a planar CdTe-based gamma ray spectrometer.

In an embodiment, the photons are detected by a semiconductor crystal.

In an embodiment, a time delay for the trigger is adjusted for each pulse by combining the pulse with a delay reference voltage.

In accordance with another aspect of the invention, there is provided a method of detecting radiation comprising detecting photons, generating pulses from the photons, shaping the pulses, detecting when the pulses have exceeded a threshold reference, and generating a threshold signal, delaying the threshold signal, and generating a trigger from the delayed threshold signal.

In an embodiment, the method further comprises generating a spectrum from the pulses, and generating the trigger to cancel depth dependence in amplitudes of the pulses on a low-energy side of high-energy peaks in the spectrum. The trigger indicates a time at which the pulses should be sampled to obtain the amplitudes. The trigger occurs at a constant delay time after the pulses have exceeded the threshold reference. When the trigger is applied at a constant delay time after the pulses have exceeded the threshold reference, depth dependence in the amplitudes of the pulses is canceled.

BRIEF DESCRIPTION OF THE DRAWINGS

The structure, operation, and methodology of the embodiments of the invention, together with other advantages thereof, may best be understood by reading the following detailed description in connection with the drawings in which each part has an assigned numeral or label that identifies it wherever it appears in the various drawings. The drawings are not necessarily to scale, emphasis instead being placed upon illustrating the principles of the invention.

DETAILED DESCRIPTION OF PREFERRED EMBODIMENTS OF THE INVENTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless specified, can be altered without affecting the scope of the disclosed and exemplary systems or methods of the present disclosure.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Figure 1:
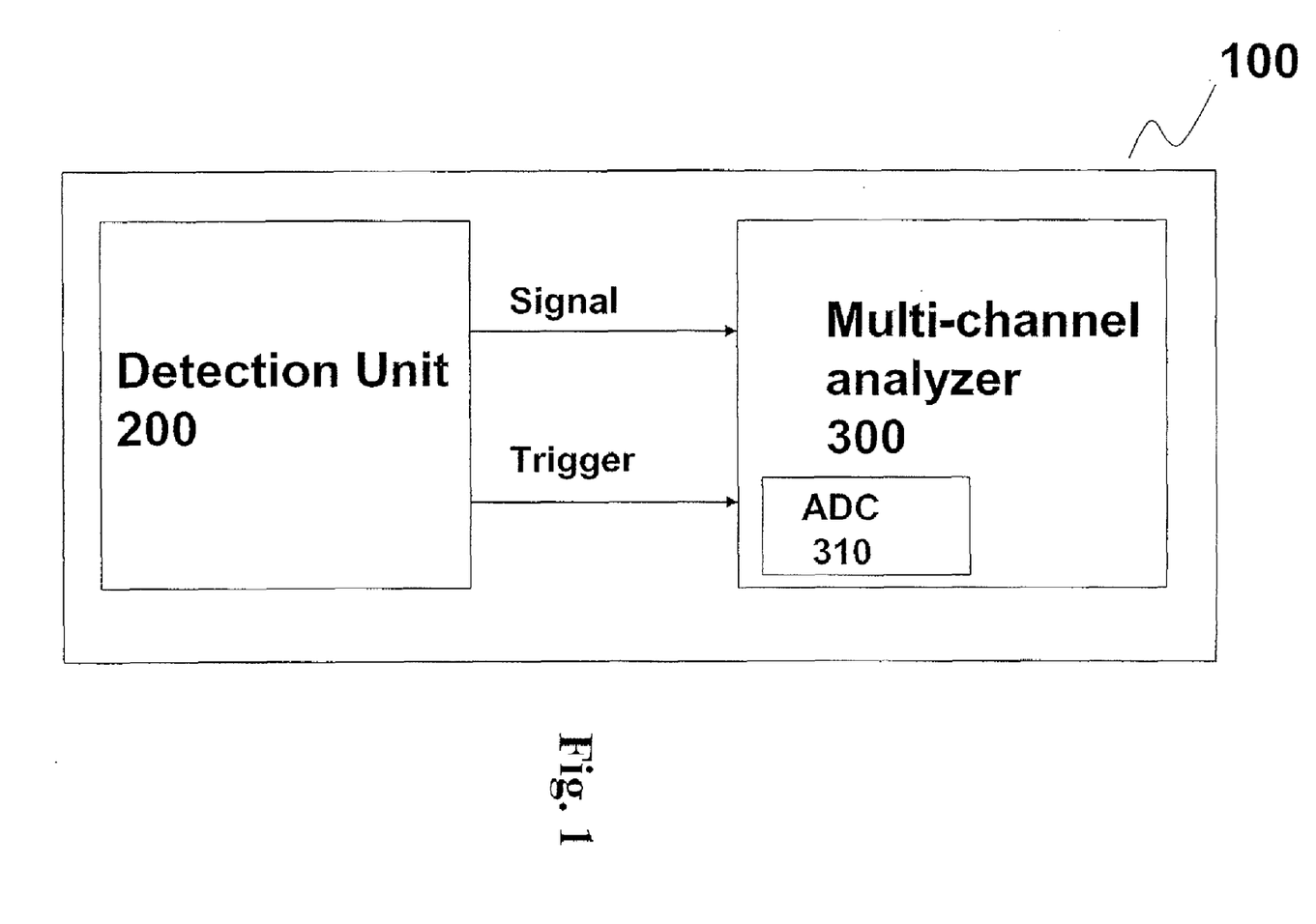
FIG. 1 is a system block diagram of a device that detects and analyzes radiation in accordance with an embodiment of the invention.

FIG. 1 is a system block diagram of a device 100 that detects and analyzes radiation in accordance with an embodiment of the invention. In an embodiment, the device 100 is a gamma ray spectrometer, such as a planar CdTe-based gamma ray spectrometer.

Referring to FIG. 1, the device 100 comprises a detection unit 200 and a multi-channel analyzer (MCA) 300. As described below, the device 100 illustrated at FIG. 1 also comprises a pulse deficit correction trigger 400.

The detection unit 200 detects radiation and produces signal pulses from the detected radiation, the pulses being suitable for passing to an analog-to-digital converter (ADC) 310 of the MCA 300. The signal pulses are output from the detection unit 200 having voltage amplitudes that are determined by an interaction of photons across the full depth of a detector 201, for example, a crystal. For example, photons that interact near a front surface of the detector produce signal pulses having faster rise times and higher amplitudes, while photons of the same energy that interact deeper in the detector produce signal pulses having slower rise times and lower amplitudes. In an embodiment, the detection unit 200 includes a room temperature semiconductor gamma ray detector. In other embodiments, the detection unit 200 includes one or more detectors that can detect other forms of electromagnetic radiation, for example, X-rays.

The MCA 300 builds spectra from the signal pulses received from the detection unit 200. In one embodiment, the MCA 300 builds gamma ray spectra. In another embodiment, the MCA 300 builds spectra from other electromagnetic radiation, such as X-ray spectra.

In an embodiment, the MCA 300 comprises an analog-to-digital converter (ADC) 310. In other embodiments, the MCA 300 further comprises circuitry such as microprocessors, field programmable gate array, and memories that enable the MCA 300 to build spectra from the pulses produced by the detection unit 200. In other embodiments, the MCA 300 is an off-the-shelf MCA comprising elements known to those of ordinary skill as enabling the off-the-shelf MCA to build spectra.

Figure 2:
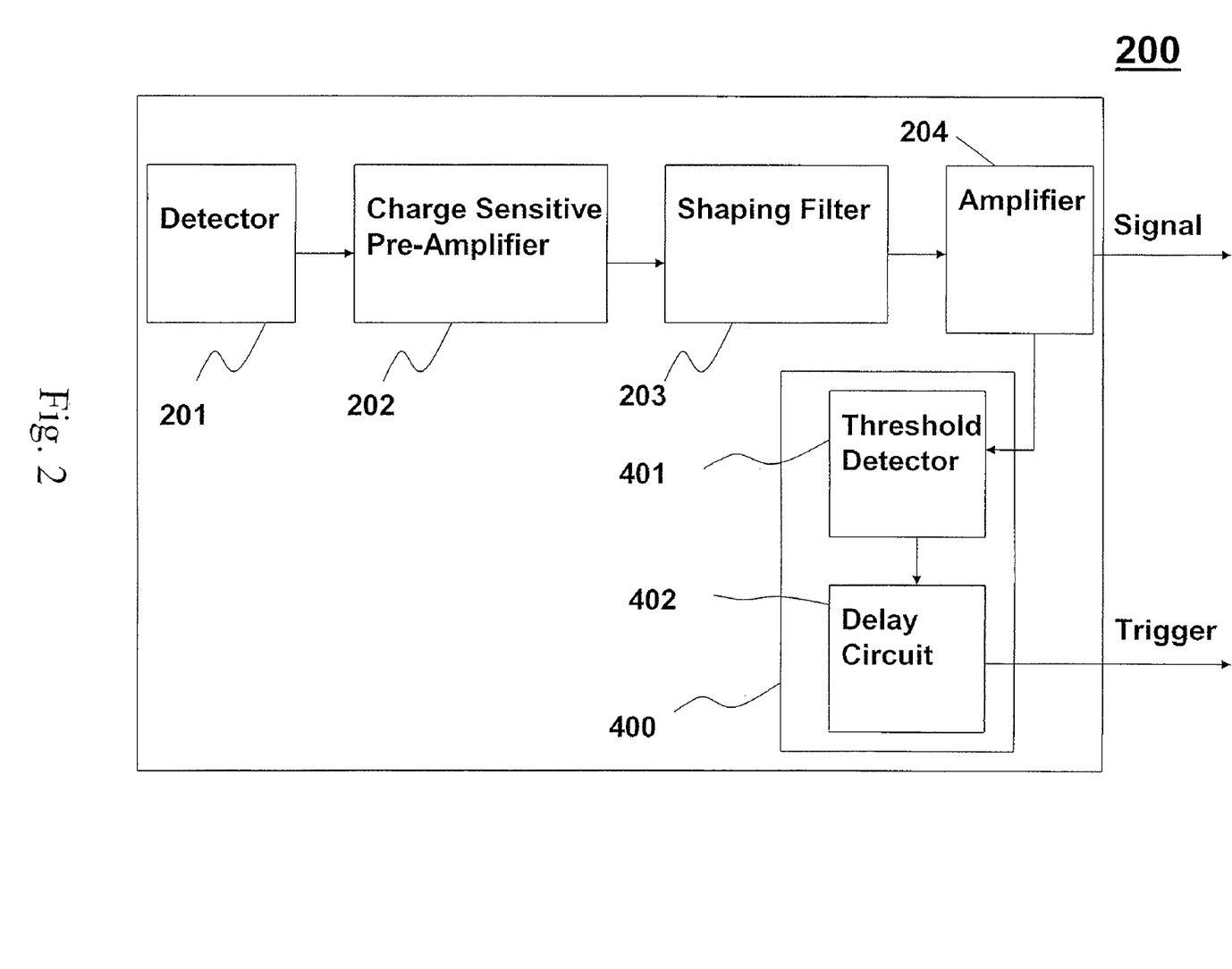
FIG. 2 is a block diagram of the detection unit of the device of FIG. 1 in accordance with an embodiment of the invention.

The pulse deficit correction trigger 400, shown in FIG. 2, generates a trigger pulse signal that is received by the ADC 310 of the MCA 300. In the embodiments illustrated at FIGS. 1 and 2, the pulse deficit correction trigger 400 is included in the detection unit 200, and, therefore, the trigger pulse signal is generated from the detection unit 200. In other embodiments, the pulse deficit correction trigger 400 is included in the MCA 300, and the trigger pulse signal is generated from the MCA 300. The pulse deficit correction trigger 400 corrects for charge deficits that can occur from photon interactions across the full depth of the detector crystal.

The ADC 310 of the MCA 300 requires a trigger pulse to indicate an instant in time at which each signal pulse should be sampled to obtain the amplitude. A conventional trigger for an ADC is generally set to capture the peak of each pulse. The trigger is typically gated by a threshold signal, so that the MCA will not trigger on electronic circuit noise but will only trigger for pulses that are large enough to be of interest. Trigger 400, on the other hand, is not set at the peak of each pulse, but, instead, trigger 400 is generated at a constant time after the pulse has exceeded a threshold reference. In this manner, depth-dependence of the amplitudes of the pulses is removed. In a preferred embodiment, the trigger signal of the trigger 400 is generated for a properly shaped pulse, such as the shaped pulses illustrated in FIG. 6.

FIG. 2 is a block diagram of the detection unit 200 of the device of FIG. 1 in accordance with an embodiment of the invention. The detection unit 200 comprises a semiconductor detector 201, a charge sensitive pre-amplifier 202, a shaping filter 203, and an amplifier 204. In addition, the detection unit 100 includes elements of the abovementioned trigger circuit 400, including a threshold detector 401 and a delay circuit 402.

In an embodiment, the detector 201 of the detection unit 200 can be a conventional detector such as a conventional gamma ray detector described herein. In an embodiment, the detector 201 of the detection unit 200 includes at least one detection crystal. The detector 201 can be an off-the-shelf detector, and can be formed of materials known to those skilled in the art, including cadmium telluride (CdTe), mercuric iodide ($HgI_2$), or cadmium zinc telluride (CdZnTe). In an embodiment, the crystal is a 10×10×1 mm CdTe crystal.

The detector 201 converts detected radiation into energy; specifically, by creating charge carriers, i.e., electrons and holes, from photons incident on the detector material. The detection unit 200 can detect gamma radiation, x-ray radiation, or other electromagnetic radiation.

During operation, a bias voltage is applied across the conducting surfaces of the detector 201. Electrons produced from photon interactions with the detector migrate toward a positive electrode or high voltage electrode coupled to a first conducting surface of the detector, and holes produced from the photon interaction with the detector migrate toward a negative electrode or ground electrode coupled to a second conducting surface of the detector.

The resulting electrical signals, or pulses, generated in response to the photon interaction with the detector 201, are amplified by the charge sensitive pre-amplifier 202, wherein the charge sensitive pre-amplifier amplifies the resulting electrical signals generated in response to the photon interaction with the detector. The amplified electrical signals are output from the pre-amplifier 202 as voltage pulses. In another embodiment, the semiconductor detector 201 can be connected through a capacitor. The capacitor permits the signal to be taken from a high voltage face of the crystal, allowing a low voltage face to be grounded, thereby removing the crystal leakage current from the feedback path of the charge sensitive pre-amplifier 202.

The charge sensitive pre-amplifier 202 produces voltage pulses having a fast rise time and a slow fall time, depending on the depth within the detector 201 at which photon interactions occur. The voltage amplitude of the rising edge of the pulses is proportional to the energy of the incident photon for an interaction near the front surface of the crystal.

Figure 3:
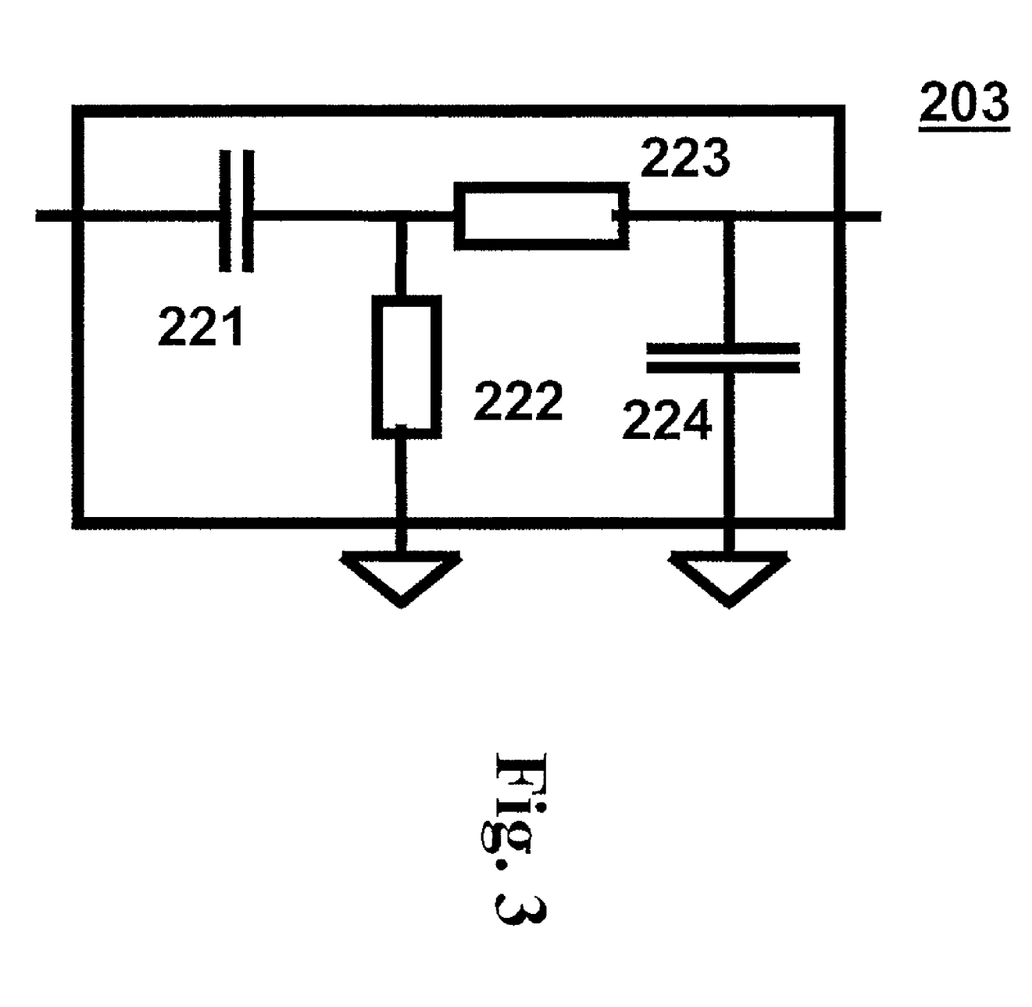
FIG. 3 is a circuit diagram of a shaping filter of the detection unit of FIG. 2 in accordance with an embodiment of the invention.

FIG. 3 is a circuit diagram of the shaping filter of FIG. 2 in accordance with an embodiment of the invention. The output of the charge sensitive pre-amplifier is passed to the shaping filter 203. In an embodiment, the shaping filter 203 is an CR-RC filter having time constants set to produce fall times that are similar to the rise times. The CR-RC filter comprises a plurality of resistors 222, 223 and capacitors 221, 224 that are combined in a manner known to one of ordinary skill as achieving the result of producing fall times that are similar to the rise times.

The output of the shaping filter 203 is output to the amplifier 204, which amplifies the pulses so that the voltage amplitude range of expected signal pulses matches the voltage input range of the analog-to-digital converter (ADC) 310 of the MCA 300. In an embodiment, the output signal of the amplifier 204 is output to the ADC 310 of the MCA 300. In another embodiment, as shown in FIG. 2, the output signal of the amplifier 204 is output to the ADC 310, and is also output to the threshold detector 401 of the trigger circuit 400.

Figure 4:
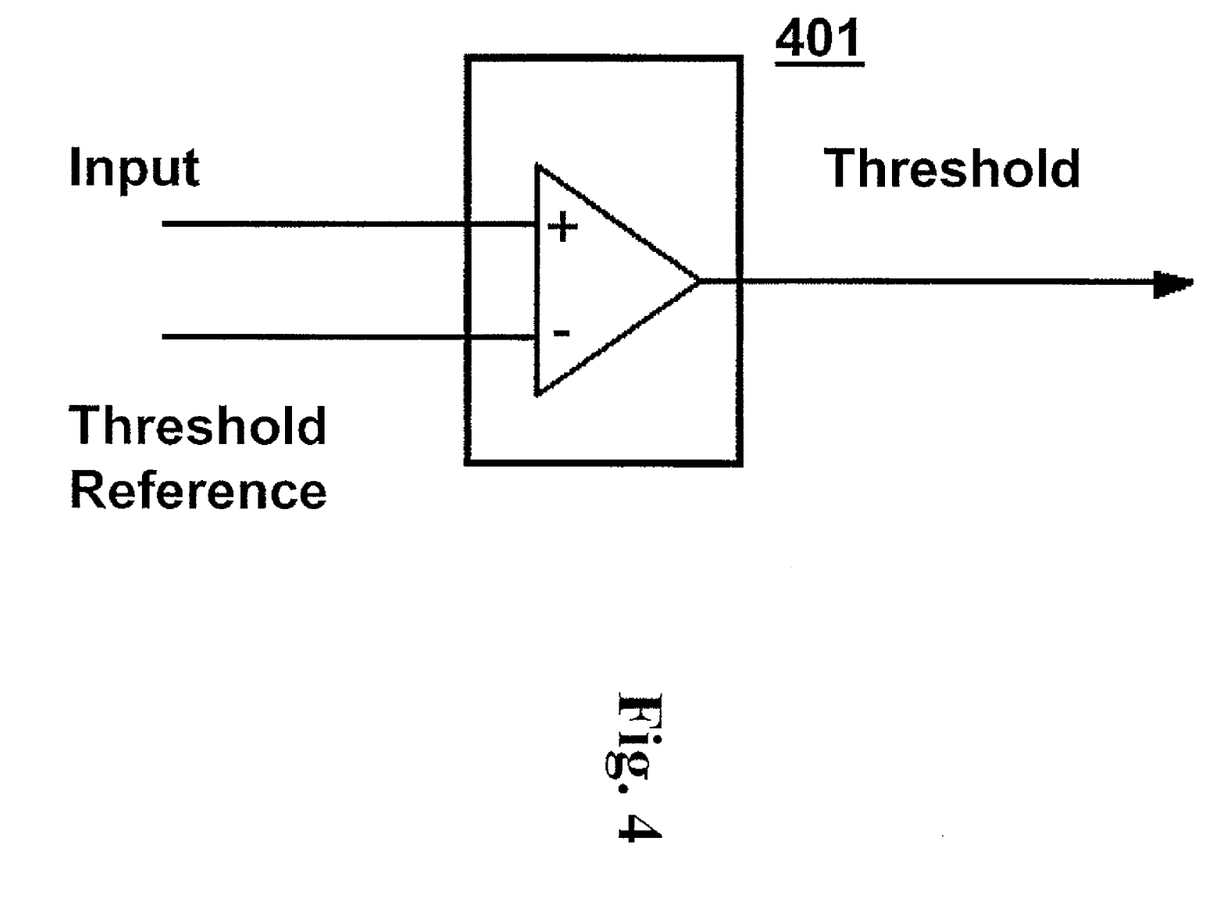
FIG. 4 is a circuit diagram of the threshold detector of the pulse deficit correction trigger of FIG. 2 in accordance with an embodiment of the invention.

FIG. 4 is a circuit diagram of the threshold detector 401 of FIG. 2 in accordance with an embodiment of the invention. As shown in FIG. 4, the threshold detector 401 compares the amplitude of the signal pulse output from the amplifier 204 to a threshold reference generated by a reference source, such as a voltage source, for example, a digital to analog converter (DAC). The output of the threshold detector 401 is a logic signal that goes true when the pulse has risen above the threshold reference. The threshold reference is typically above the electronic noise of the circuitry and below any signal of interest.

The threshold detector output is received by the delay unit 402. In an embodiment, the delay unit 402 is coupled to the ADC 310 of the MCA 300. In this manner, the trigger circuit 400 applies a delay to the threshold detector output, and generates the trigger pulse in response to the delayed threshold detector output.

Figure 5:
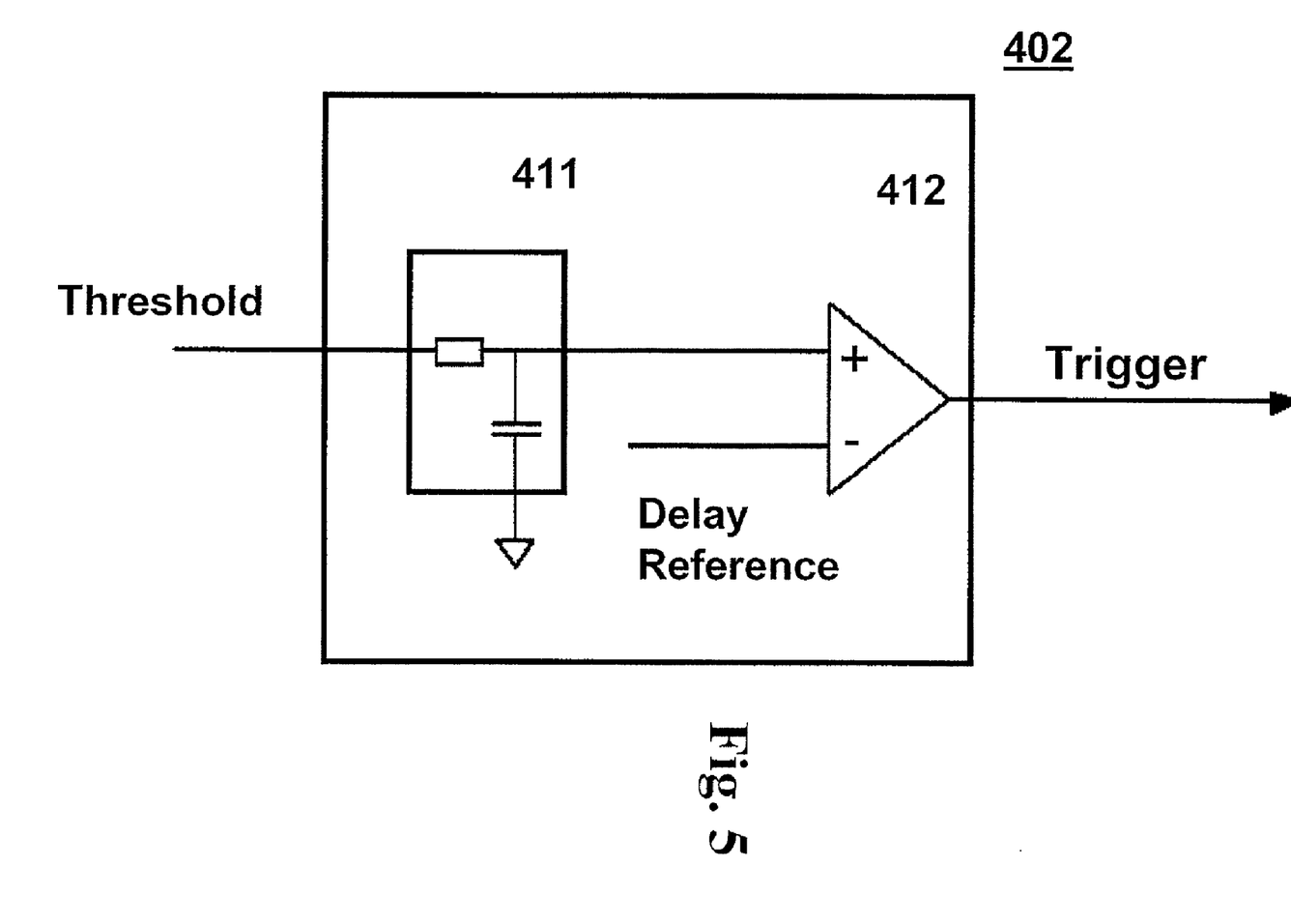
FIG. 5 is a circuit diagram of the delay circuit of the pulse deficit correction trigger of FIG. 2 in accordance with an embodiment of the invention.
Figure 6:
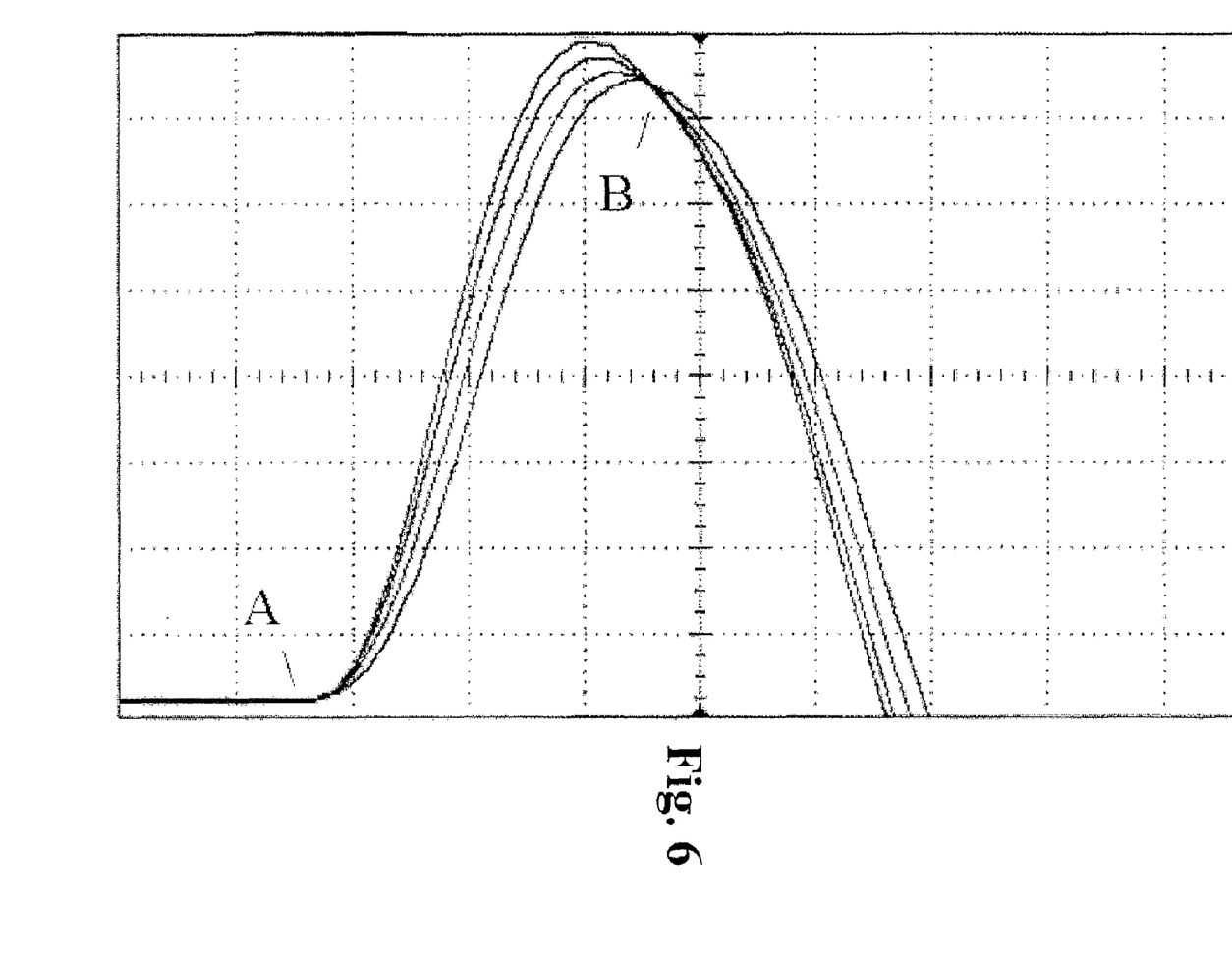
FIG. 6 is a graph which illustrates a family of pulses produced by incident photons of the same energy interacting at different depths within a semiconductor detector.

FIG. 5 is a circuit diagram of the delay circuit 402 of FIG. 2 in accordance with an embodiment of the invention. As shown in FIG. 5, the delay circuit 402 comprises an RC circuit 411 and a comparator 412. The reference voltage for the comparator is set by a voltage source. The delay circuit 402 outputs the trigger pulse to the ADC 310. As a result, the ADC 310 is not triggered at the peak of the pulse as is done in traditional circuits, but instead, the ADC 310 is triggered after the peak of the pulse. As shown in FIG. 6, the delay time is set so that the trigger occurs at a time after the peak of the pulse and on the falling slope of the shaped pulse. Since the trigger will occur at a constant delay time after the pulse first passes over the threshold, the faster rising pulses will have reached their peak and decayed more than the slower pulses by the time the trigger is generated. If the time constant for the falling slope of the pulse is set correctly, then the amount that each pulse has decayed by the time the trigger is generated will cancel out the depth-dependent amplitude difference.

In an embodiment, the threshold detector 401 that is used in the trigger circuit may be the same threshold circuit that is required to prevent the device from triggering on electronic circuit noise. In a preferred embodiment, both threshold detectors are set above the electronic circuitry noise level and below any signal pulse of interest in order to be effective. The use of the threshold circuit for both purposes also allows additional cost savings to be achieved due to a reduction in the number of components required.

FIG. 6 is a graph which illustrates a family of pulses produced by incident photons of the same energy interacting at different depths within a semiconductor detector. The graph shown in FIG. 6 can be produced by an off-the-shelf storage oscilloscope which collects pulses from the detection unit shown in FIG. 2, then adjusts the horizontal offset of the display so that the threshold detection signals (not shown) are aligned. Signal pulses produced for the graph of FIG. 6 represent a range of pulses across the full depth of a crystal. The shaped pulses illustrated at FIG. 6 are shaped pulses of 662 keV photons at the output of the amplifier 204. The photons that interact near the front surface of the crystal produce pulses with faster rise times and higher amplitudes. Photon interactions at deeper locations within the crystal produce pulses with slower rise times and lower amplitudes. As shown in FIG. 6, all of the signal pulses pass through two points, A and B; the first point A being where the pulses begin to rise, and the second point B being slightly after the peak of the pulses. The first point A corresponds to the time when each pulse has exceeded a pre-defined threshold. When the delay circuit 402 is set so that the second point B of convergence of the pulses is the sample time of the ADC 310 of the MCA 300, then all of these pulses will produce the same value out of the ADC 310, thereby canceling the depth dependence in the voltage amplitude of the pulses.

Figure 7:
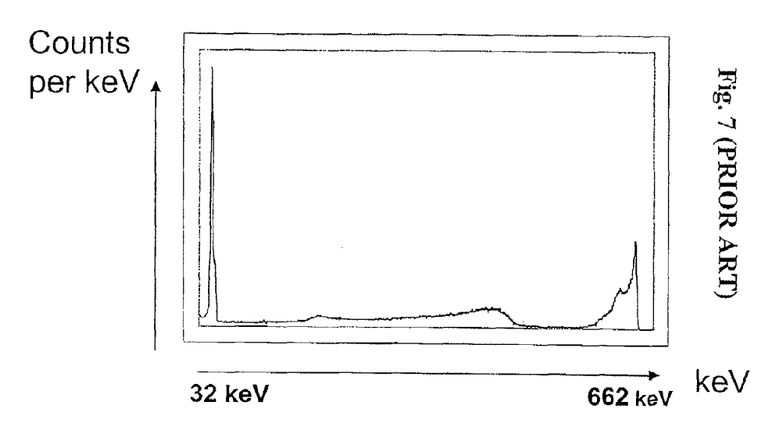
FIG. 7 illustrates spectra that are collected from a detector crystal using a conventional trigger.
Figure 8:
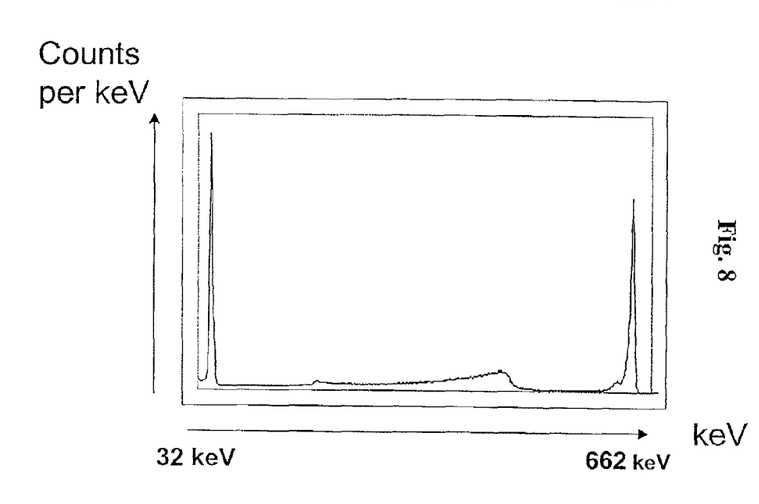
FIG. 8 illustrates spectra that are collected from a detector crystal using a trigger circuit in accordance with an embodiment of the invention.

FIG. 7 illustrates spectra collected by a crystal detector using a conventional trigger. FIG. 8 illustrates spectra collected by a crystal detector using a trigger circuit in accordance with an embodiment of the invention. In an embodiment, the spectra include Cs137 spectra. For purposes of distinguishing the trigger 400 shown in FIG. 2 from conventional triggers, the spectra illustrated in FIGS. 7 and 8 are collected with the same crystal detector. The graphs illustrated in FIGS. 7 and 8 each includes an x-axis measured in kiloelectron volts (keV) and a y-axis measuring counts per keV. FIGS. 7 and 8 each illustrate Cs137 has two peaks in its spectrum, one at 32 keV and one at 662 keV. However, in FIG. 7, the 662 keV peak on the right of the spectrum shows effects of hole tailing. It can be seen in the Cs137 spectrum of FIG. 8 that this method of correction produces a spectrum that has superior resolution and collection efficiency in the 662 keV photopeak compared to an uncorrected spectrum, for example, as shown in FIG. 7. The correction shown in FIG. 8 has caused the tail on the low energy side of the 662 keV peak to disappear, thereby moving counts from the tail into the photopeak, and improving histogram count amplitude. The corrected photopeak shown in FIG. 8 is essentially symmetrical, the small artifact on the low energy side of the corrected 662 keV peak being an escape peak caused by the ejection of an x-ray from the detector material. Also the Full Width Half Maximum (FWHM) at 662 keV is significantly less for the corrected spectrum.

Figure 9:
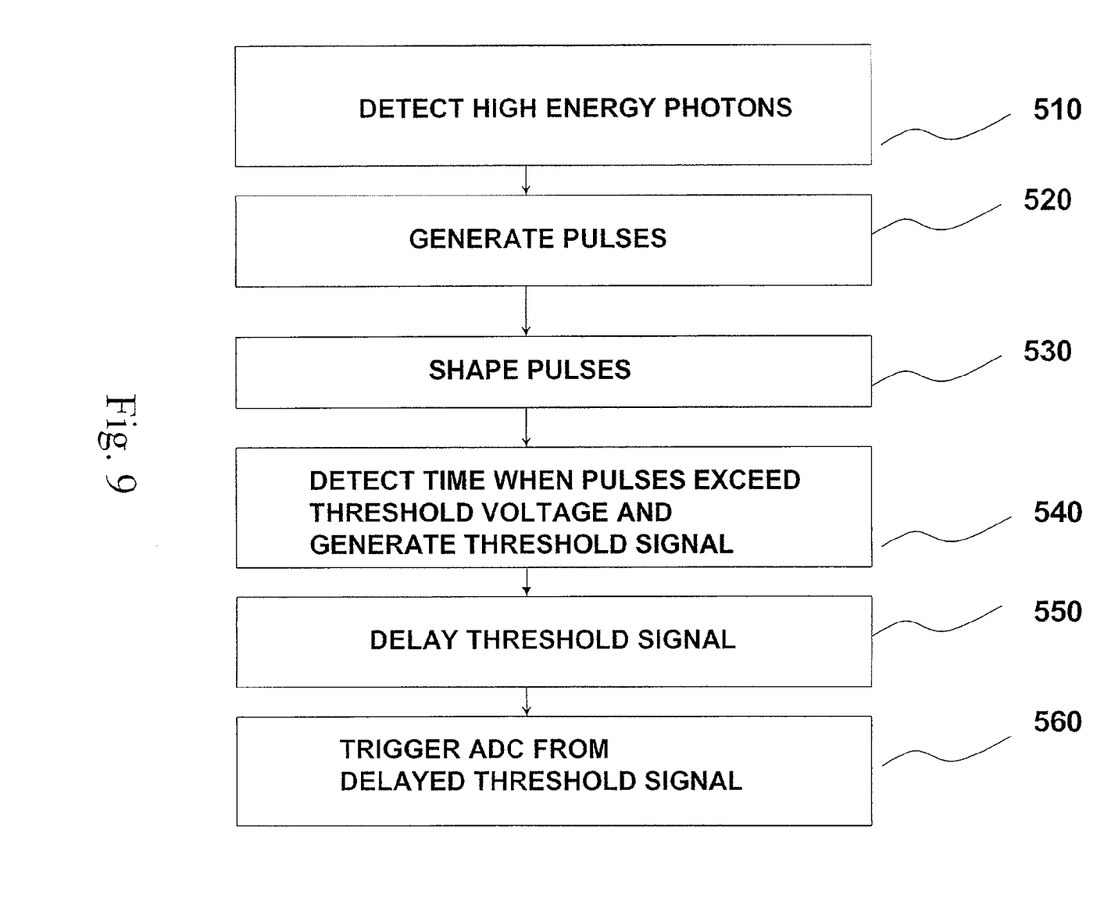
FIG. 9 is a flowchart of the steps used to correct for hole tailing in a semiconductor gamma ray detector in accordance with an embodiment of the present invention.

FIG. 9 contains a flowchart of the steps used to correct for hole tailing in a semiconductor gamma ray spectrometer in accordance with an embodiment of the present invention. First, as shown in Step 510, high energy photons are detected. In an embodiment, the photons are detected with a semiconductor crystal. Next, as shown in Step 520, pulses are generated from the high energy photons. In an embodiment, the pulses are generated with a charge sensitive pre-amplifier. Next, as shown in Step 530, the pulses are shaped. In an embodiment, the pulses are shaped with an CR-RC filter. Next, as shown in Step 540, a time is detected when pulses exceed a threshold voltage, and a threshold signal is generated. In an embodiment, the pulses are sufficiently shaped for the threshold signal to be generated. The sufficiently shaped pulses can result from pseudo-Gaussian, triangular, trapezoidal pulse shaping, or other shaping techniques known to those of ordinary skill. Next, as shown in Step 550, the threshold signal is delayed. Next, as shown in Step 560, an ADC is triggered from the delayed threshold signal.

An advantage of the devices and methods described herein is that the resulting spectrum has greatly increased collection efficiency in photopeaks at energies above about 100 keV, speeding up the collection of spectra and reducing the time required to produce a statistically significant spectrum. Another advantage is that the resolution of the photopeaks at these energies as measured by the FWHM is greatly improved. This reduction in the FWHM is very important when the apparatus is used as a radionuclide identifier, because improved resolution provides the ability to distinguish between the characteristic spectra of differing radionuclides that might otherwise be obscured. In an embodiment, the trigger circuit improves the resolution so that the devices can yield a FWHM of 1% at 662 keV using the entire bulk of the crystal.

The devices and methods described herein may affect the signal-to-noise ratio because the trigger to the ADC does not occur at the peak of each pulse, which may have an effect on the low energy end of the spectrum. In an embodiment, the devices and methods described herein can be enhanced to limit this effect on the low energy pulses by reducing the delay at low energy by adjusting the delay reference voltage for each pulse by summing the actual pulse signal and the delay reference voltage from a voltage source, for example, a digital-to-analog converter (DAC) through either a resistor or a capacitor or other network to produce a variable delay reference voltage. This will have the effect of reducing the delay for low energy pulses thereby selecting a trigger time that is closer to the peak of the pulse, and improving the signal to noise ratio for these pulses.

The point of convergence for the curves, for example, point B shown in FIG. 6, can vary as a function of the energy of the incident photon. The point of convergence is set by factors such as the rise time, the fall time, and the threshold level, or a combination thereof. In an embodiment, the trigger circuits disclosed herein can be applied to improve the alignment of the trigger time with the point of convergence as a function of the spectral energy. In another embodiment, the circuitry may be enhanced by adjusting the threshold reference voltage as a function of the pulse amplitude for each pulse, so that the ADC sample time coincides with the point at which the curves converge at each energy across the spectrum.

The devices and methods for correcting hole tailing of room temperature semiconductor radiation detectors have wide potential application in many fields where detectors and analyzers, such as gamma ray spectrometers, gamma cameras, and radionuclide identifiers, are used including, but not limited to, nuclear medicine, environmental cleanup, waste monitoring, and emergency response.

This method of correcting for the hole tailing may produce a non-linearity in the spectrum. This can be due to the relation of the threshold reference voltage to the pulse amplitude voltage, which is larger for lower energy pulses, thereby producing reduced gain at the low end of the spectrum. Another non-linearity may be introduced if the point of convergence forms at a point of differing amplitude relative to the full amplitude as a function of spectral energy. These spectral non-linearities need not be corrected for each pulse, but may instead be corrected by a microprocessor operating on data at the spectrum level.

The devices and methods of the invention thereby create improved resolution in CdTe gamma-ray spectrometers by using a novel trigger to correct for the depth of interaction dependence, thereby improving the resolution of peaks above 100 keV. In addition, the devices and methods produce a very slight loss of resolution at low energy and a correctable non-linearity in the spectrum.

While this invention has been particularly shown and described with references to preferred embodiments thereof, it will be understood to those skilled in the art that various changes in form and details may be made herein without departing from the spirit and scope of the invention as defined in the appended claims.

What is claimed is:

1. A device for detecting and analyzing radiation comprising:
    a detection unit including a detector, the detection unit generating signal pulses from photons of the radiation, each signal pulse having an amplitude that is determined by an interaction of photons at a depth of the detector;
    a pulse deficit correction trigger that corrects for charge deficits resulting from the photon interaction by removing a depth dependence in the amplitudes of the signal pulses;
    a multi-channel analyzer that generates a spectrum from the signal pulses, and that receives a trigger signal generated by the pulse deficit correction trigger to remove the depth dependence in the amplitudes of the signal pulses.

2. The device of claim 1, wherein the detection unit comprises a room-temperature semiconductor gamma ray detector.

3. The device of claim 2, wherein the detector includes a crystal.

4. The device of claim 3, wherein the crystal comprises a material including at least one of CdTe and CdZnTe.

5. The device of claim 1, wherein the detection unit detects at least one of X-rays and gamma rays.

6. The device of claim 1, wherein the detection unit comprises:
    a detector that generates pulses from the photons;
    a charge sensitive pre-amplifier that amplifies the pulses;
    a shaping filter that shapes the pulses; and
    an amplifier that generates the signal pulses having the amplitudes from the shaped pulses.

7. The device of claim 6, wherein the trigger circuit comprises:
- a threshold detector that generates a threshold signal in response to a comparison between the amplitudes of the signal pulses and a threshold reference;
- a delay circuit that applies a delay to the threshold signal, and generates the trigger signal from the delayed threshold signal.

8. The device of claim 7, wherein the trigger signal is generated at a constant delay time after the signal pulses have exceeded the threshold reference.

9. The device of claim 8, wherein the multi-channel analyzer is triggered by the trigger signal to indicate a time at which each signal pulse should be sampled to obtain the amplitude.

10. The device of claim 9, wherein when the multi-channel analyzer is triggered at a constant delay time after the signal pulses have exceeded the threshold reference, the depth dependence in the amplitude of each pulse is removed.

11. The device of claim 1, wherein the multi-channel analyzer comprises an analog-to-digital converter that is triggered by the trigger signal.

12. A gamma ray spectrometer comprising:
- a detector that detects photons and generates pulses from the photons;
- a shaping filter that shapes the pulses;
- a threshold detector that detects when the pulses have exceeded a threshold reference, and generates a threshold signal;
- a delay circuit that delays the threshold signal;
- a trigger circuit that generates a trigger from the delayed threshold signal; and
- a multi-channel analyzer that generates a spectrum from the pulses and that receives the trigger from the trigger circuit to cancel depth dependence in amplitudes of the pulses on a low-energy side of high-energy peaks in the spectrum.

13. The spectrometer of claim 12, wherein the trigger is applied to an analog-to-digital converter of the multi-channel analyzer.

14. The spectrometer of claim 13, wherein the analog-to-digital converter is triggered to indicate a time at which the pulses should be sampled to obtain the amplitudes.

15. The spectrometer of claim 14, wherein the trigger is generated at a constant delay time after the pulses have exceeded the threshold reference.

16. The spectrometer of claim 15, wherein when the analog-to-digital converter is triggered at a constant delay time after the pulses have exceeded the threshold reference, the depth-dependence in the amplitudes of the pulses is canceled.

17. The spectrometer of claim 12, wherein the gamma ray spectrometer is a planar CdTe-based gamma ray spectrometer.

18. The spectrometer of claim 12, wherein the photons are detected by a semiconductor crystal.

19. The spectrometer of claim 12, wherein a time delay for the trigger is adjusted for each pulse by combining the pulse with a delay reference voltage.

20. A method of detecting radiation comprising:
- detecting photons;
- generating pulses from the photons;
- shaping the pulses;
- detecting when the pulses have exceeded a threshold reference and generating a threshold signal;
- delaying the threshold signal;
- generating a trigger from the delayed threshold signal; and
- generating the trigger to cancel depth dependence in amplitudes of the pulses on a low-energy side of high-energy peaks in a spectrum that is generated by the pulses.

21. The method of claim 20, wherein the trigger indicates a time at which the pulses should be sampled to obtain the amplitudes.

22. The method of claim 20, wherein the trigger occurs at a constant delay time after the pulses have exceeded the threshold reference.

23. The method of claim 22, wherein when the trigger is applied at a constant delay time after the pulses have exceeded the threshold reference, depth dependence in the amplitudes of the pulses is canceled.

* * * * *

UNITED STATES PATENT AND TRADEMARK OFFICE
CERTIFICATE OF CORRECTION

PATENT NO.         : 7,576,326 B2                                    Page 1 of 1
APPLICATION NO.    : 11/759389
DATED              : August 18, 2009
INVENTOR(S)        : Dexter Eames

It is certified that error appears in the above-identified patent and that said Letters Patent is hereby corrected as shown below:

On the Title page, (56) References Cited, OTHER PUBLICATIONS, line 2, replace "Gemma" with --Gamma--

On the Title page, (74) Attorney, Agent, or Firm, replace "Miles & Onello" with --Mills & Onello--

Signed and Sealed this

Seventeenth Day of November, 2009

David J. Kappos
*Director of the United States Patent and Trademark Office*